(12) United States Patent
Mourkogiannis et al.

(10) Patent No.: US 10,475,483 B2
(45) Date of Patent: Nov. 12, 2019

(54) METHOD AND SYSTEM FOR RECORDING AND PLAYING VIDEO USING ORIENTATION OF DEVICE

(71) Applicant: Snap Inc., Santa Monica, CA (US)

(72) Inventors: Celia Mourkogiannis, San Francisco, CA (US); Guillaume Sabran, San Francisco, CA (US); Jacob Trefethen, San Francisco, CA (US); Luis Tueros-Grimaldo, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 30 days.

(21) Appl. No.: 15/597,006

(22) Filed: May 16, 2017

(65) Prior Publication Data

US 2018/0338111 A1    Nov. 22, 2018

(51) Int. Cl.
| | | |
|---|---|---|
| *G11B 27/34* | (2006.01) | |
| *G11B 27/036* | (2006.01) | |
| *H04N 5/232* | (2006.01) | |
| *G11B 27/00* | (2006.01) | |
| *H04N 5/783* | (2006.01) | |
| *H04N 9/82* | (2006.01) | |
| *H04N 5/77* | (2006.01) | |

(52) U.S. Cl.
CPC .......... *G11B 27/036* (2013.01); *G11B 27/005* (2013.01); *G11B 27/34* (2013.01); *H04N 5/23238* (2013.01); *H04N 5/783* (2013.01); *H04N 9/8205* (2013.01); *H04N 5/77* (2013.01)

(58) Field of Classification Search
None
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,071,970 B2 | 7/2006 | Benton |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,754,941 B1 | 6/2014 | Sarwari et al. |

(Continued)

*Primary Examiner* — Eileen M Adams
(74) *Attorney, Agent, or Firm* — Schwegman Lundberg & Woessner, P.A.

(57) ABSTRACT

A method and system for recording and playing a video are provided. The method includes receiving an input, from a first user, to start recording of the video. An orientation of a recording device is detected for a plurality of frames while recording the video. An input to stop recording of the video is then received. The video is stored in a video file and the orientation of the recording device for the plurality of frames is stored as metadata associated with the video file. The playing includes receiving an input to play the video from a second user. An orientation of a playing device is detected. The video file is accessed, and the video is played using the metadata, the input received from the second user, and the orientation of the playing device. The video file is used to control speed and direction of the video.

16 Claims, 5 Drawing Sheets

(56) References Cited

U.S. PATENT DOCUMENTS

| | | |
|---|---|---|
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,275,683 B1 | 3/2016 | Hundemer et al. |
| 9,443,227 B2 | 9/2016 | Evans et al. |
| 9,489,661 B2 | 11/2016 | Evans et al. |
| 9,491,134 B2 | 11/2016 | Rosen et al. |
| 9,659,380 B1 | 5/2017 | Castellani et al. |
| 9,723,258 B2 | 8/2017 | Gates |
| 9,762,848 B2 | 9/2017 | Nowakowski et al. |
| 9,762,938 B2 | 9/2017 | Oyman |
| 2009/0248300 A1 | 10/2009 | Dunko et al. |
| 2009/0251594 A1 | 10/2009 | Hua et al. |
| 2011/0202598 A1 | 8/2011 | Evans et al. |
| 2011/0228846 A1 | 9/2011 | Eilat et al. |
| 2012/0086725 A1* | 4/2012 | Joseph ............... G06F 3/0346 345/629 |
| 2012/0209924 A1 | 8/2012 | Evans et al. |
| 2013/0050574 A1 | 2/2013 | Lu et al. |
| 2013/0108175 A1 | 5/2013 | Ptucha |
| 2013/0127915 A1 | 5/2013 | Gilra |
| 2013/0321313 A1 | 12/2013 | Huang et al. |
| 2014/0022433 A1* | 1/2014 | Glennie ............ H04N 5/23212 348/333.02 |
| 2014/0098197 A1 | 4/2014 | Geris et al. |
| 2014/0114190 A1 | 4/2014 | Chiang et al. |
| 2014/0245367 A1 | 8/2014 | Sasaki et al. |
| 2015/0174477 A1 | 6/2015 | Jackson et al. |
| 2015/0281300 A1 | 10/2015 | Ganesh et al. |
| 2016/0358628 A1* | 12/2016 | Liu ..................... G11B 27/031 |
| 2017/0104928 A1* | 4/2017 | Chase ..................... H04N 5/77 |
| 2017/0187983 A1* | 6/2017 | Lawrence ............... H04N 5/92 |
| 2017/0236495 A1 | 8/2017 | Braun et al. |

* cited by examiner

METHOD AND SYSTEM FOR RECORDING AND PLAYING VIDEO USING ORIENTATION OF DEVICE

TECHNICAL FIELD

The present disclosure relates to a method and a system for recording video using orientation of a recording device, and playing video using orientation of both a playing device and the recording device.

BACKGROUND

Currently, recording of panoramic videos and providing workflows associated with the panoramic videos is a challenge. Mobile phone users cannot capture a panoramic video with their phone camera that lets them both (1) capture movement in what they are filming, and (2) control where to look on playback.

Most phone cameras cannot shoot in 360 degrees, and buying a separate camera is expensive and cumbersome. Full 360 degree videos do not let the user focus on a particular scene. In addition, regular editing tools are not that well suited to full 360 degree video. Text is only displayed to the viewer when they are looking in certain directions, and other providers do not offer augmented reality filters that interact with the scene. Some applications such as YouTube®, Facebook® and other platforms do not offer a way to view 360 degree videos with filters and text that display to the viewer whichever direction they are looking.

In view of the above, there is a need for a method and system that records video using orientation of a recording device, and plays video using orientation of both a playing device and the recording device for user convenience.

SUMMARY

Various embodiments of the present disclosure provide systems and methods for recording video using orientation of a recording device, and playing video using orientation of both a playing device and the recording device.

The method for recording the video includes receiving an input, from a first user, to start recording the video. An orientation of a recording device is detected for a plurality of frames while recording the video. An input to stop recording of the video is then received. The video is stored in a video file and the orientation of the recording device for the plurality of frames is stored as metadata associated with the video file. The video file is used to control speed and direction of the video at time of playing based on the metadata, orientation of a playing device at time of playing, and input received from a second user.

The method for playing the video includes receiving an input to play the video from a second user. An orientation of a playing device is detected. A video file including the video and metadata is accessed. The metadata includes orientation of a recording device for a plurality of frames while recording the video. The video is played using the metadata, the input received from the second user, and the orientation of the playing device.

A system includes a processor. The system also includes a memory coupled to the processor. The memory stores instructions which when executed by the processor cause the system to perform a method for recording a video. The method includes receiving an input, from a first user, to start recording of the video. An orientation of a recording device is detected for a plurality of frames while recording the video. An input to stop recording of the video is then received. The video is stored in a video file and the orientation of the recording device for the plurality of frames is stored as metadata associated with the video file. The video file is used to control speed and direction of the video at time of playing based on the metadata, orientation of a playing device at time of playing, and input received from a second user.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present disclosure provide systems and methods for recording video based on orientation of a recording device, and playing video using orientation of both a playing device and the recording device.

The recording device includes an application for recording a video, such as a panoramic video (also referred to as 360 degree video) or a non-panoramic video. The application can be in form of a plug-in, a standalone application, a web application, or any other application capable of recording the video. A user (first user) of the recording device provides an input to start recording the video. The application then records the video. The application is also in communication with an operating system of the recording device or in some embodiments, in direct communication with a gyroscope or accelerometer of the recording device to detect orientation of the recording device at various instances during the recording. In one embodiment, the orientation of the recording device is determined at each and every frame of the video. In other embodiment, optimization may be done to determine the orientation at predefined or optimized instances or frames. The user provides another input to stop recording of the video. The recorded video is then stored in a video file. The orientation of the recording device for a plurality of frames of the video is also stored as metadata associated with the video file. In various embodiments, the metadata plus the video is referred to as a slice. The slice can be panoramic or non-panoramic. The non-panoramic video includes the video which can be recorded using existing solutions. The metadata can be stored in the video file, outside the video file in a separate file, as information in a database or any other combination or variation of these.

In one embodiment, the video file is shared with a second user. The second user plays the video file using a playing device having the application. In another embodiment, the first user can play the video file using the application present on the recording device.

The playing includes receiving an input from the user to play the video. The orientation of the playing device is then determined by the application using the gyroscope and/or the accelerometer of the playing device. The video file is accessed to access the video and associated metadata. The video is then played using the metadata, the input, and the orientation of the playing device. The metadata is used to provide full control to the user to control speed and direction of the video, and to provide correct orientation view to the user. The second user can watch the slice, i.e. the video, using the orientation of the playing device or using the input, i.e. scrubbing, received from the touchscreen. In case the slice is non-panoramic then the slice can be moved forward or backward in time using the touch input or using the movement of the phone detected via a gyroscope or accelerometer or both. In case the slice is panoramic, then the slice can be moved forward or backward in time or in space or in both using the touch input or using the movement of the phone or using both.

In some embodiments, various filters such as augmented reality filters, static filters, effects etc. can be applied to the video during or after recording. The filter information can be stored as additional metadata. The metadata can be accessed while playing the video file to generate the effects. A text layer can also be added over the video to provide text visibility all the times and without any impact due to orientation as the text is overlaid horizontally over the video.

Various embodiments allow anyone with a portable device having image capturing capability such as a mobile phone to capture panoramic video of surroundings. In addition, the slices are particularly good for capturing movements in a scene at a high frame rate that can be watched slowly or sped up by the second user. The orientation of the recording device is also captured at high frequency. The embodiments can be used to capture and share moments like the following: groups of friends, family events, selfie videos, nature and landscapes, concerts, parties, sports events, urban events, and real estate. In addition, the embodiments provide various other advantages as follows:

360 degree video: If the user owns a 360 degree camera that captures full 360 degree video in all directions, then the user can upload and edit videos in the application, either by uploading through phone's camera roll, or through custom integrations of the application with camera manufacturers. To watch the 360 degree video on the application, the user can use the gyroscope or touchscreen and look around the whole scene.

Editing: The user can improve the quality of the 360 degree video using the application. The application allows users to preview videos, add text and filters to the video, including augmented reality filters.

Story: The videos are organized into a story format. When user clicks to view one video, other videos from the same creator load once the first video is finished. Items captured within the same day are ordered in chronological order; different days are ordered in reverse chronological order.

Sharing: The user can share the video with friends and followers on the application, contacts in phone book, or on other social networks, either at the time of creating the video, or afterwards.

Augmented Reality filters: The filters display as the user is capturing and/or watching the video. The filters interact with the underlying scene by sensing where and how fast the user is moving the phone using the phone's gyroscope and accelerometer, and project other images and videos on top to make the video more interesting, funny, or otherwise compelling.

Web player: Separate 360 degree video player allows the user to watch 360 degree video from the application on the web, without downloading the application. The application web player integrates with other social sites.

Figure 1:
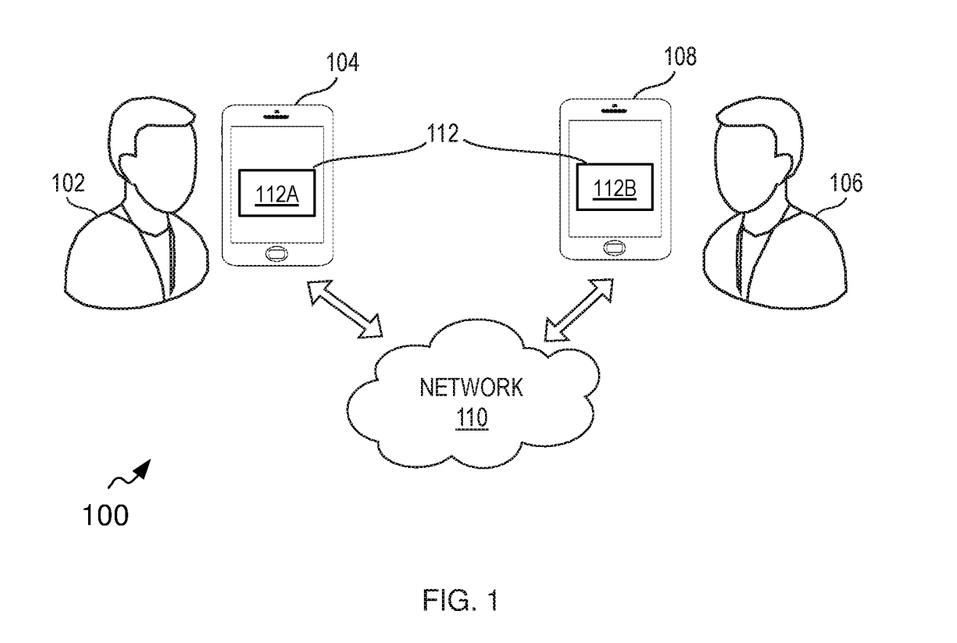
FIG. 1 is a block diagram of an environment, in accordance with an example embodiment of the invention.

FIG. 1 is a block diagram of an environment, in accordance with an example embodiment of the invention.

The environment 100 includes a user 102 having a recording device 104 and a user 106 having a playing device 108. Each user device has an application 112 that enables recording and playing of a video. For example, the recording device 104 has the application 112 which is enabled in recording mode in illustrated environment 100 and hence, labeled as the application 112A (also referred to as the recording engine 112A). The playing device 108 has the application 112 which is enabled in playing mode in illustrated environment 100 and hence, labeled as the application 112B (also referred to as the playing engine 112B).

In illustrated environment 100, the recording device 104 and the playing device 108 are communicably coupled via a network 110. Examples of the network 110 may include the Internet, a wide-area network, a local-area network, a client-server network such as a cloud-computing network, or other such network.

Examples of the recording device 104 or the playing device 108 include, but are not limited, a smartphone, a mobile phone with camera and the application, a laptop, a tablet, or any other processor or computing device having camera and the application.

In one embodiment, the recording device 104 can also act as the playing device 108 when the video is viewed on the recording device 104.

Figure 2:
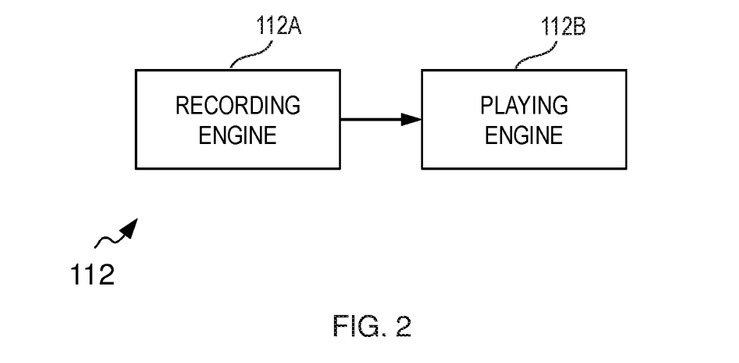
FIG. 2 is a block diagram of an application, in accordance with an example embodiment of the invention.

FIG. 2 is a block diagram of an application 112, in accordance with an example embodiment of the invention. The application 112 includes a recording engine 112A and a playing engine 112B. Based on user input, the application 112 may enter into the recording mode or into the playing mode. The recording engine 112A enables the user to record 360 degree or panoramic video. The recording engine 112A also enables determining and storing of orientation of a user device while recording for a plurality of frames of the video as metadata. The recorded video is then played using the playing engine 112B. The playing engine 112B reads the stored video and the metadata for appropriate playing to give same experience as the user had at the time of recording.

Figure 3:
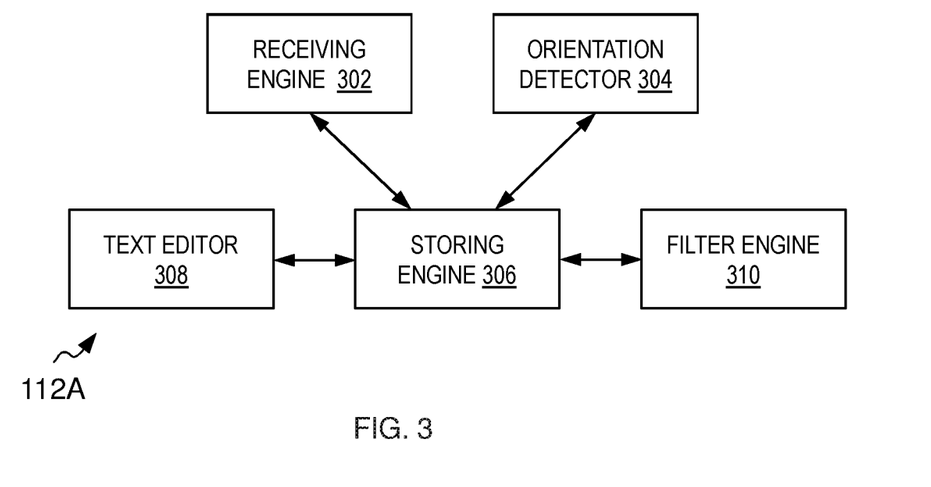
FIG. 3 is a block diagram of a recording engine, in accordance with an example embodiment of the invention.

FIG. 3 is a block diagram of the recording engine 112A, in accordance with an example embodiment of the invention. The recording engine 112A includes a receiving engine 302 for receiving an input to start recording a video. An orientation detector 304 detects orientation of a user device (i.e. the recording device) while recording the video for the plurality of frames of the video. In some embodiments, the orientation is determined for all the frames of the video. The signals or reading indicating the orientation are recorded using a gyroscope or an accelerometer of the user device and passed to the orientation detector 304 for processing and determining of the orientation. The recorded video and the detected orientation are provided to a storing engine 306 for storing in response to an input, received by the receiving engine 302, indicating stopping of the recording. The orientation is stored as metadata associated with the video or with a video file including the video.

In some embodiments, the user is also provided with an option to add text as a layer on top of the video by a text editor 308. The text editor 308 then provides the text to the storing engine 306 for storing the text in the video file.

In some embodiments, options are provided to the user by a filter engine 310 to add augmented reality filter or static filter to create effects. The filters chosen by the user are then stored in the video file.

The video file can then be shared by the user with one or more other users using a sharing engine (not shown in FIG. 3). The sharing engine enables sharing via various options, for example Facebook®, social media, messaging application or any other sharing option.

Figure 4:
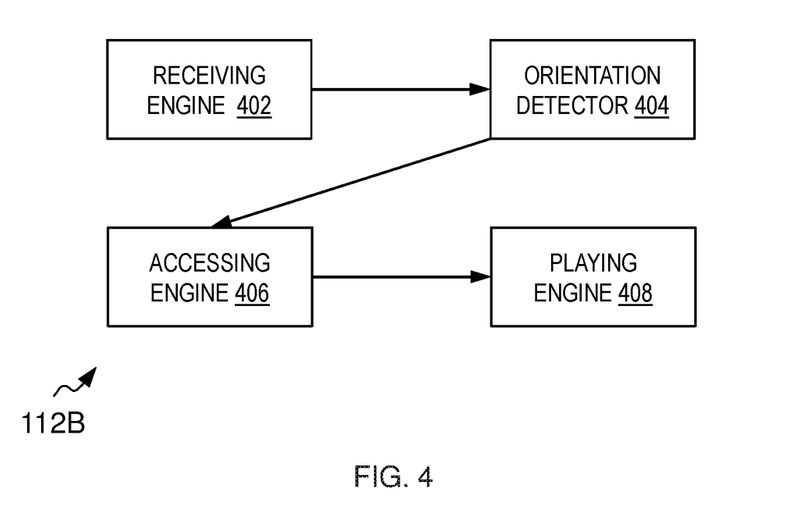
FIG. 4 is a block diagram of a playing engine, in accordance with an example embodiment of the invention.

FIG. 4 is a block diagram of the playing engine 112B, in accordance with an embodiment of the invention.

The playing engine 112B includes a receiving engine 402 for receiving an input to play a video. An orientation detector 404 detects current orientation of the user device. The signals or reading indicating the orientation are detected using a gyroscope or an accelerometer of the user device and passed to the orientation detector 404 for processing and determining of the orientation. The signals can be provided to the orientation detector 404 directly by the gyroscope or the accelerometer or via an operating system of the user device. An accessing engine 406 accesses the video file and reads the metadata. The playing engine 408 then plays the video using the metadata, the orientation of the user device, and the input. The orientation of the user device (playing device) is matched with that of the recording device or appropriate correction is applied to play video at appropriate angle. The user can provide inputs by touching the screen of the user device or by moving the user device in an arc or in any direction or angle that can be detected. In response to the user input, the playing engine moves the video in time or in space or in both. For example, if the user does not move phone but only touches the screen then video moves in time. If the user moves phone in arc then video moves in space. If user does both, then the video moves in both time and space. It is to be appreciated that the implementation may differ from one embodiment to other, and hence, the video can be made to move in time and space.

The playing engine 408 also accesses and reads the text and filters, and applies the text and filters to the video. The user may also be provided options while playing to apply filters other than those present in the metadata.

Figure 5:
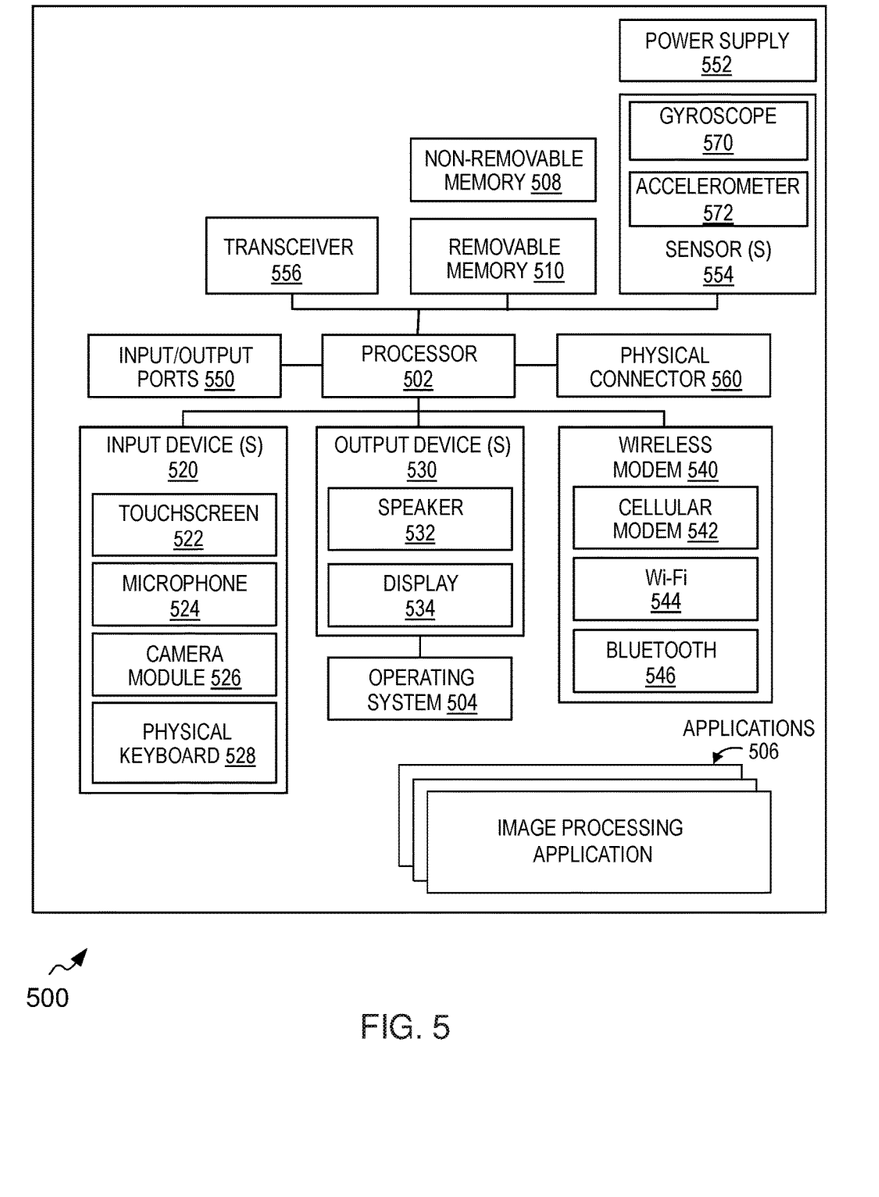
FIG. 5 is a block diagram of a computer system, in accordance with an example embodiment of the invention.

FIG. 5 is a block diagram of a computer system 500, in accordance with an example embodiment of the invention. The computer system 500 represents an example of the recording device.

It should be understood that the computer system 500 as illustrated and hereinafter described is merely illustrative of one type of device and should not be taken to limit the scope of the embodiments. As such, it should be appreciated that at least some of the components described below in connection with the computer system 500 may be optional and thus in an example embodiment may include more, less or different components than those described in connection with the example embodiment of the FIG. 5. As such, among other examples, the computer system 500 could be any of mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated computer system 500 includes a controller or a processor 502 (e.g., a signal processor, microprocessor, ASIC, or other control and processing logic circuitry) for performing such tasks as signal coding, data processing, image processing, input/output processing, power control, and/or other functions. An operating system 504 controls the allocation and usage of the components of the computer system 500 and support for one or more applications programs (see image processing application 506), such as the application 112, that implements one or more of the innovative features described herein.

The illustrated computer system 500 includes one or more memory components, for example, a non-removable memory 508 and/or removable memory 510. The non-removable memory 508 can include RAM, ROM, flash memory, a hard disk, or other well-known memory storage technologies. The removable memory 510 can include flash memory, smart cards, or a Subscriber Identity Module (SIM). The one or more memory components can be used for storing data and/or code for running the operating system 504 and the applications 506. Example of data can include web pages, text, images, sound files, image data, video data, or other data sets to be sent to and/or received from one or more network servers or other devices via one or more wired or wireless networks.

The computer system 500 can support one or more input devices 520 and one or more output devices 530. Examples of the input devices 520 may include, but are not limited to, a touchscreen 522 (e.g., capable of capturing finger tap inputs, finger gesture inputs, multi-finger tap inputs, multi-finger gesture inputs, or keystroke inputs from a virtual keyboard or keypad), a microphone 524 (e.g., capable of capturing voice input), a camera module 526 (e.g., capable of capturing still picture images and/or video images) and a physical keyboard 528. Examples of the output devices 530 may include, but are not limited to a speaker 532 and a display 534. Other possible output devices (not shown in the FIG. 5) can include piezoelectric or other haptic output devices. Some devices can serve more than one input/output function. For example, the touchscreen 522 and the display 534 can be combined into a single input/output device.

A wireless modem 540 can be coupled to one or more antennas (not shown in the FIG. 5) and can support two-way communications between the processor 502 and external devices, as is well understood in the art. The wireless modem 540 is shown generically and can include, for example, a cellular modem 542 for communicating at long range with the mobile communication network, a Wi-Fi compatible modem 544 for communicating at short range with an external Bluetooth-equipped device or a local wireless data network or router, and/or a Bluetooth-compatible modem 546. The wireless modem 540 is typically configured for communication with one or more cellular networks, such as a GSM network for data and voice communications within a single cellular network, between cellular networks, or between the computer system 500 and a public switched telephone network (PSTN).

The computer system 500 can further include one or more input/output ports 550, a power supply 552, one or more sensors 554 for example, an accelerometer 572, a gyroscope 570, a compass, or an infrared proximity sensor for detecting the orientation or motion of the computer system 500, a transceiver 556 (for wirelessly transmitting analog or digital signals) and/or a physical connector 560, which can be a USB port, IEEE 594 (FireWire) port, and/or RS-232 port. The illustrated components are not required or all-inclusive, as any of the components shown can be deleted and other components can be added.

Figure 6:
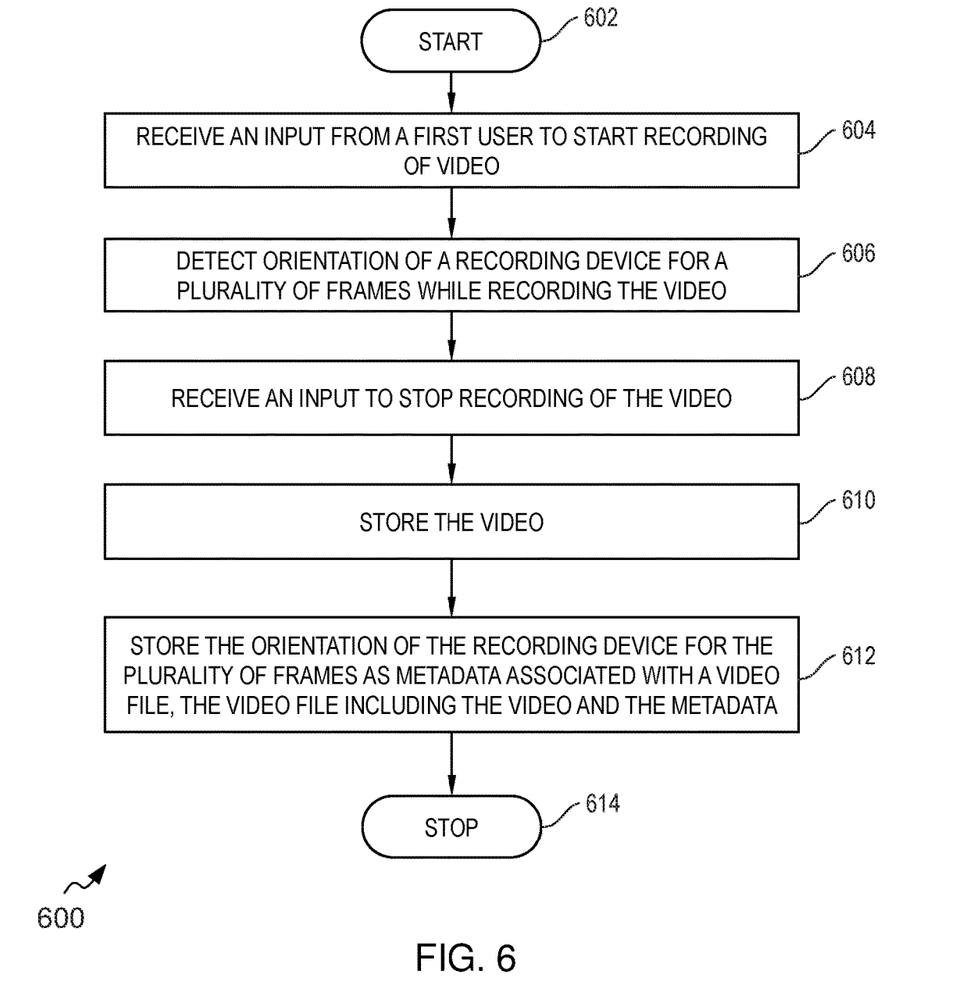
FIG. 6 is a flowchart illustrating a method for recording a video, in accordance with an example embodiment.

FIG. 6 is a flowchart illustrating a method 600 for recording a video, in accordance with an example embodiment.

Operations of the flowchart, and combinations of operation in the flowchart, may be implemented by, for example, hardware, firmware, a processor, circuitry and/or a different device associated with the execution of software that includes one or more computer program instructions.

The method 600 starts at step 602.

At step 604, an input is received from a first user to start recording of a video. The input may be provided by clicking a record button provide via user interface of the application or by performing a gesture or by providing the input in any other form.

At step 606, orientation of the recording device is detected for a plurality of frames of the video while recording. The orientation is detected using a gyroscope or an accelerometer.

In some embodiments, cues are also provided to the user so that while recording the user does not move the recording device outside the cues and the constraints are followed. In addition, in some embodiments, the angle moved by the recording device is also displayed to the user so that the user is aware of the movement of the recording device.

At step 608, another input to stop recording of the video is received.

At step 610, the video is stored in response to the stop input as a video file. In some embodiments, options are provided to the user to preview the video and edit the video.

At step 612, the orientation of the recording device is stored for the plurality of frames as metadata associated with the video file.

In some embodiments, the user also provides text and selects other filters to be applied to the video. The text and other filters are also stored as metadata associated with the video file.

The user may then choose to share the video file with other users via one or more options provided by the application or by other applications on the user device.

The method stops at step 614.

Figure 7:
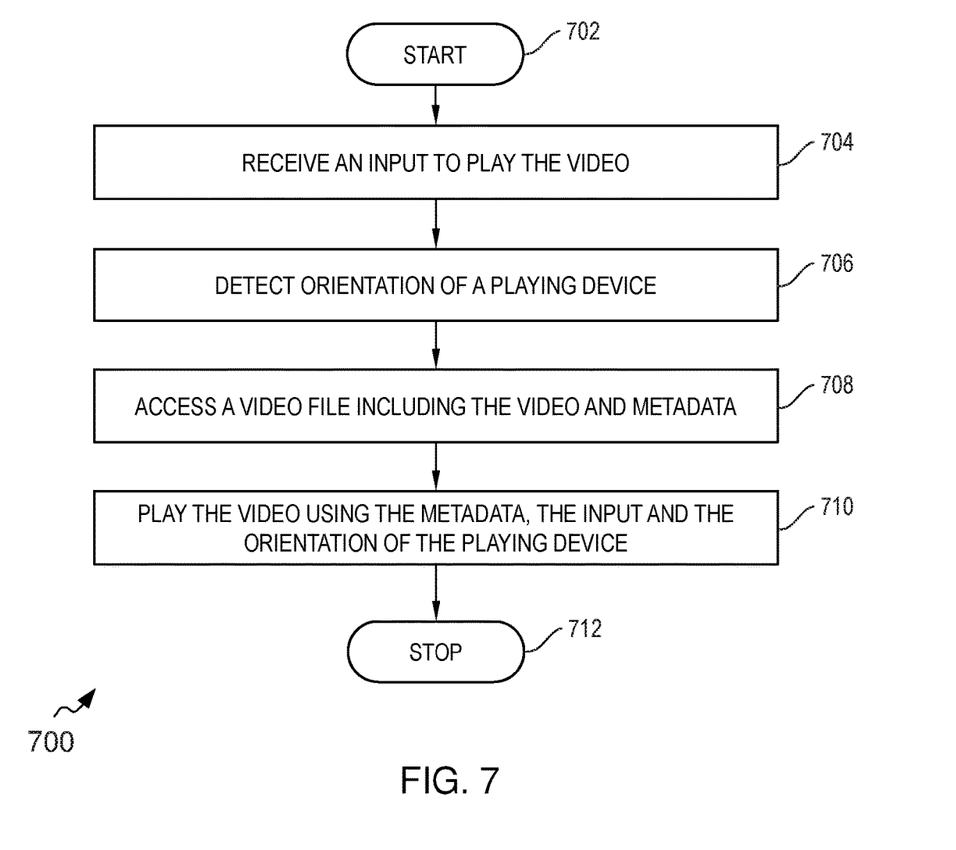
FIG. 7 is a flowchart illustrating a method for playing a video, in accordance with an example embodiment.

FIG. 7 is a flowchart illustrating a method 700 for playing a video, in accordance with an example embodiment.

Operations of the flowchart, and combinations of operation in the flowchart, may be implemented by, for example, hardware, firmware, a processor, circuitry and/or a different device associated with the execution of software that includes one or more computer program instructions.

The method 700 starts at step 702.

At step 704, an input to play the video is received.

At step 706, orientation of the playing device is detected using a gyroscope and/or an accelerometer of the playing device.

At step 708, the video file including the video and the metadata is accessed. The metadata includes the orientation of the recording device at time of recording the video for the plurality of frames of the video. The video is played, at step 710, using the orientation of the playing device, the metadata and the input.

In various embodiments, the playing includes decoding the video, pausing the video, and then selecting what to display based on scrubbing by the user (gyroscope or touchscreen input). As the user scrubs through the video, the input is matched to the metadata about the recording device's phone angle to give the user full control over playback speed and direction.

In some embodiments, filters such as augmented reality (AR) filter are also displayed as a layer on top of the video, and the method 700 makes the AR filter's frame correspond to the orientation of the metadata, so that the position and animation relate to the position of the recording device at that time code.

In some embodiments, the text is read from the metadata and displayed as a layer on top of the video. The text may be displayed as flat layer throughout the frames to avoid any impact or orientation of the recording device or the playing device.

In various embodiments, the user can scrub backwards or forwards in time by dragging fingers on the touchscreen or tilting the playing device using the gyroscope. The metadata is used to determine which part of the video to display. The input can be in form of touch input or movement of the phone. The movement of the video can be in time or in space or in both based on the input and implementation of the application.

The method 700 stops at step 712.

The disclosed methods or one or more operations of the methods may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Various embodiments of the invention may include one or more computer programs stored or otherwise embodied on a computer-readable medium, wherein the computer programs are configured to cause a processor or computer to perform one or more operations (for example, operations explained herein with reference to FIGS. 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:
   receiving at a recording device, a plurality of image frames, the plurality of image frames corresponding to a respective device orientation forming part of a predefined plurality of device orientations for the recording device;
   storing the plurality of image frames;
   storing the predefined plurality of device orientations for the recording device for the plurality of frames as metadata associated with the plurality of image frames;
   transmitting the plurality of image frames to a playing device;
   detecting, a playing device orientation of the playing device;
   receiving, a user input at the playing device;
   receiving a movement of the playing device;
   in response to the user input and the user movement, presenting, on a graphical user interface presented on the playing device, the plurality of image frames by adjusting each respective device orientation of the predefined plurality of device orientations for the recording device based on the playing device orientation, and a playback direction of the plurality of image frames.

2. The method of claim 1, further comprising:
   detecting the playing device orientation using at least one of a gyroscope or an accelerometer.

3. The method of claim 1 further comprising:
   receiving additional user input from the recording device; and
   in response to the additional user input, constraining the motion of the recording device.

4. The method of claim 1 further comprising:
   receiving additional user input from the recording device; and
   in response to the additional user input, adding text as an overlay on the plurality of image frames.

5. The method of claim 1 further comprising:
   receiving additional user input from the recording device; and
   in response to the additional user input, adding at least one of augmented reality filters or visual filters as an overlay on the plurality of image frames.

6. The method of claim 5 further comprising:
   storing the filters as metadata associated with the plurality of image frames.

7. The method of claim 1 further comprising:
causing presentation of a current orientation of the recording device on a graphical user interface of the recording device while receiving the plurality of image frames.

8. The method of claim 1, wherein the plurality of image frames is a panoramic video.

9. The method of claim 1 further comprising:
receiving additional user input from the recording device; and in response to the additional user input, causing presentation of the plurality of image frames on a graphical user interface of the recording device.

10. The method of claim 1, wherein the user input is received by detecting a movement of the playing device.

11. A system comprising: a processor; and a memory coupled to the processor, the memory storing instructions which when executed by the processor configure the system to preform operations comprising:
receiving at a recording device, a plurality of image frames, the plurality of image frames corresponding to a respective device orientation forming part of a predefined plurality of device orientations for the recording device;
storing the plurality of image frames; storing the predefined plurality of device orientations for the recording device for the plurality of frames as metadata associated with the plurality of image frames;
transmitting the plurality of image frames to a playing device; detecting, a playing device orientation of the playing device;
receiving, a user input at the playing device;
receiving a movement of the playing device;
in response to the user input and the user movement, presenting, on a graphical user interface presented on the playing device, the plurality of image frames by adjusting each respective device orientation of the predefined plurality of device orientations for the recording device based on the playing device orientation, and a playback direction of the plurality of image frames.

12. The system of claim 11, further comprising:
detecting the recording device orientation using at least one of a gyroscope or an accelerometer.

13. The system of claim 11 further comprising:
receiving additional user input from the recording device; and
in response to the additional user input, constraining the motion of the recording device.

14. The system of claim 11 further comprising:
receiving additional user input from the recording device; and
in response to the additional user input, adding text as an overlay on the plurality of image frames.

15. The system of claim 11 further comprising:
receiving additional user input from the recording device;
in response to the additional user input, adding at least one of augmented reality filters or visual filters as an overlay on the plurality of image frames; and
storing at least one of the augmented reality filters or the visual filters as metadata associated with the plurality of image frames.

16. The system as claimed in claim 11 and further comprising:
causing presentation of a current orientation of the recording device on a graphical user interface of the recording device while receiving the plurality of image frames.

* * * * *